US012786158B2

(12) United States Patent
Kang et al.

(10) Patent No.: US 12,786,158 B2
(45) Date of Patent: Nov. 3, 2026

(54) ELECTRONIC DEVICE FOR DERIVING DOMAIN CONNECTED TO IP ADDRESS AND METHOD FOR THE SAME

(71) Applicant: AI SPERA INC., Seoul (KR)

(72) Inventors: Byungtak Kang, Seoul (KR); Dong Sik Choi, Seoul (KR)

(73) Assignee: AI SPERA INC., Seoul (KR)

( * ) Notice: Subject to any disclaimer, the term of this patent is extended or adjusted under 35 U.S.C. 154(b) by 99 days.

(21) Appl. No.: 18/946,309

(22) Filed: Nov. 13, 2024

(65) Prior Publication Data

US 2025/0158959 A1 May 15, 2025

(30) Foreign Application Priority Data

Nov. 15, 2023 (KR) ........................ 10-2023-0158221

(51) Int. Cl.
*H04L 61/4511* (2022.01)

(52) U.S. Cl.
CPC ................................ *H04L 61/4511* (2022.05)

(58) Field of Classification Search
CPC ............................ G06N 20/00; H04L 61/4511
See application file for complete search history.

(56) References Cited

U.S. PATENT DOCUMENTS

2020/0134469 A1* 4/2020 Choo ...................... G06N 3/045
2021/0073661 A1* 3/2021 Matlick ............... H04L 61/3025
2022/0114220 A1* 4/2022 Kang .................... G06F 16/951
2022/0188699 A1* 6/2022 Matlick ............... G06F 21/6254
2023/0275922 A1* 8/2023 Choi ................... H04L 63/1441
2024/0330483 A1* 10/2024 Seyeditabari ......... G06F 21/577
2026/0030131 A1* 1/2026 Shanmugam ....... G06F 11/3414
2026/0087144 A1* 3/2026 Drew .................... G06F 21/577

FOREIGN PATENT DOCUMENTS

KR 10-0925402 B1 11/2009
KR 10-2361513 B1 2/2022
KR 10-2022-0089977 A 6/2022
KR 10-2023-0127450 A 9/2023

OTHER PUBLICATIONS

Office Action issued in KR 10-2023-0158221; mailed by the Korean Ministry of Intellectual Property on Sep. 29, 2025.

* cited by examiner

*Primary Examiner* — June Sison
(74) *Attorney, Agent, or Firm* — Studebaker Brackett PLLC

(57) ABSTRACT

Provided are an electronic device for deriving a domain connected to the IP address based on Open Source INTelligence (OSINT) information and for deriving the domain connected to the IP address based on an artificial intelligence (AI) model, and a method for the same.

12 Claims, 5 Drawing Sheets

FIG. 4

| Dataset | | | | | | | |
|---|---|---|---|---|---|---|---|
| domain | logic_1 | logic_2 | logic_3 | logic_4 | logic_5 | logic_6 | is_real |
| sample_1.com | 1 | 0 | 1 | 0 | 1 | 0 | 1 |
| sample_2.com | 0 | 1 | 0 | 1 | 0 | 1 | 0 |
| sample_3.com | 1 | 0 | 0 | 0 | 0 | 0 | 1 |
| sample_4.com | 0 | 0 | 1 | 0 | 0 | 1 | 0 |

FIG. 5

| domain | logic_1 | logic_2 | logic_3 | logic_4 | logic_5 | logic_6 |
|---|---|---|---|---|---|---|
| A | 1 | 1 | 0 | 0 | 0 | 1 |
| B | 0 | 0 | 1 | 1 | 1 | 0 |
| C | 0 | 0 | 0 | 1 | 1 | 0 |

ELECTRONIC DEVICE FOR DERIVING DOMAIN CONNECTED TO IP ADDRESS AND METHOD FOR THE SAME

CROSS-REFERENCE TO RELATED APPLICATIONS

A claim for priority under 35 U.S.C. § 119 is made to Korean Patent Application No. 10-2023-0158221 filed on Nov. 15, 2023 in the Korean Intellectual Property Office, the entire contents of which are hereby incorporated by reference.

BACKGROUND

Embodiments of the present disclosure described herein relate to a network technology, and more particularly, relate to an electronic device for deriving a domain connected to an Internet Protocol (IP) address based on Open Source INTelligence (OSINT) information and a method for the same An IP address refers to an identifier for identifying a device presenting in a network corresponding to an address over the Internet, and includes up to 12 digits. The IP address may include a global IP address allocated to all devices connected the Internet, a private IP address used in a confined place such as an inner part of a company or premises, a dynamic IP address which is obtained as an IP address, which is not used, is automatically allocated when connected, and a fixed IP address which may be connected only to an authorized device and a user.

Meanwhile a domain may refer to a thing obtained by substituting a numeric value of the IP address corresponding to an address over the Internet into a character string which is recognizable by a user, and may mainly be used as at least a portion of a uniform resource locator (URL) and an e-mail. In general, a user may perform Internet telecommunication based on the domain, or the computer may process information based on a computer language. Accordingly, the computer may relay between the computer and the user by deriving the IP address matched with the relevant domain based on a Domain Name System (DNS) technology.

Various solutions have been developed regarding a manner for matching the IP address using the domain, which is similar to the above-described DNS technology. However, to the contrary, any manner for matching the domain using the IP address has never been developed. The manner for matching the domain using the IP address may be applied to various fields in terms of network management such as detecting a fishing site, analyzing a security log, or limiting an authority for accessing a server. Accordingly, the necessity for the manner for matching the domain using the IP address has been raised.

References to Korean Patent Registration Nos. 10-0925402B1 and 10-2361513B1 may be made for the above description.

SUMMARY

Embodiments of the present disclosure provide an electronic device for deriving a domain connected to an Internet Protocol (IP) address based on Open Source INTelligence information and a method for the same.

Embodiments of the present disclosure provide an electronic device for deriving a domain connected to an Internet Protocol (IP) address based on an artificial intelligence (AI) model and a method for the same.

Problems to be solved by the present disclosure are not limited to the problems mentioned above, and other problems not mentioned will be clearly understood by those skilled in the art from the following description.

According to an embodiment, an electronic device for deriving a domain connected to an Internet Protocol (IP) address may include a communication device to make communication with an outside, a memory, and a processor including at least one core, the processor may detect multiple pieces of domain information corresponding to a target IP address based on a Hypertext Markup Language (HTML) source, input an input dataset related to the multiple pieces of domain information into each of a plurality of models trained through a machine-learning scheme, derive an output value from each of the plurality of models, based on the input dataset, calculate a weight value corresponding to the each of the plurality of models, derive a final output value corresponding to each of the multiple pieces of domain information, based on the output value derived from each of the plurality of models and the weight value corresponding to each of the plurality of models, and select representative domain information by comparing the final output values, which correspond to the multiple pieces of domain information, to each other.

In addition, the HTML source may be extracted through a banner grabbing operation corresponding to the target IP address, and the multiple pieces of domain information may be detected from the HTML source using a plurality of logics preset.

In addition, the plurality of logics may include a first logic for detecting domain information based on a location of an 80-th port banner for the target IP address, a second logic for detecting the domain information based on meta property="og:url"content="{domain_name}" of the 80-th port banner and a 433-th port banner for the target IP address, a third logic for detecting the domain information based on a Common Name of a certificate (SSL; Secure Sockets Layer) of the 433-th port banner for the target IP address, a fourth logic for detecting the domain information based on "Subject CN" of the 433-th port banner certificate for the target IP address, a fifth logic for detecting the domain information based on a 'DNS name' of the 433-th port banner certificate for the target IP address, and a sixth logic for extracting all uniform resource locators (URLs) in a banner for the target IP address and for detecting a domain, which occupies a highest proportion, among domains starting with 'www', as the domain information.

In addition, the plurality of models may include a RandomForest model, an XGBoost model, an SVM model, a LightGBM model, a CatBoost model, a Logistic Regression model, and a Lasso model.

In addition, the plurality of models may be trained through the machine-learning scheme based on a learning dataset corresponding to the IP address, and the learning dataset may be structured with respect to at least one IP address extracted through a port-scanning operation for a plurality of IP addresses.

In addition, the port-scanning operation may be to extract the at least one IP address in which an 80-th port or a 433-port is open.

In addition, the learning dataset may include the multiple pieces of domain information detected based on an HTML source extracted through a banner grabbing operation corresponding to the at least one IP address. In addition, the learning dataset may be updated in every preset period.

According to an embodiment, a method performed by an electronic device to extract a domain connected to an Internet Protocol (IP) address, may include detecting multiple pieces of domain information corresponding to a target IP address based on a Hypertext Markup Language (HTML) source, inputting an input dataset related to the multiple pieces of domain information into a plurality of models trained through the machine-learning scheme, deriving an output value from each of the plurality of models, based on the input dataset, calculating a weight value corresponding to the each of the plurality of models, deriving a final output value corresponding to each of the multiple pieces of domain information, based on the output value derived from each of the plurality of models and the weight value corresponding to each of the plurality of models, and selecting representative domain information by comparing the final output values, which correspond to the multiple pieces of domain information, to each other.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 4 is a view illustrating a dataset used for training an AI model according to an embodiment of the present disclosure.

FIG. 5 is a view to describe data input into an AI model to derive a domain according to an embodiment of the present disclosure.

DETAILED DESCRIPTION

Figure 1:
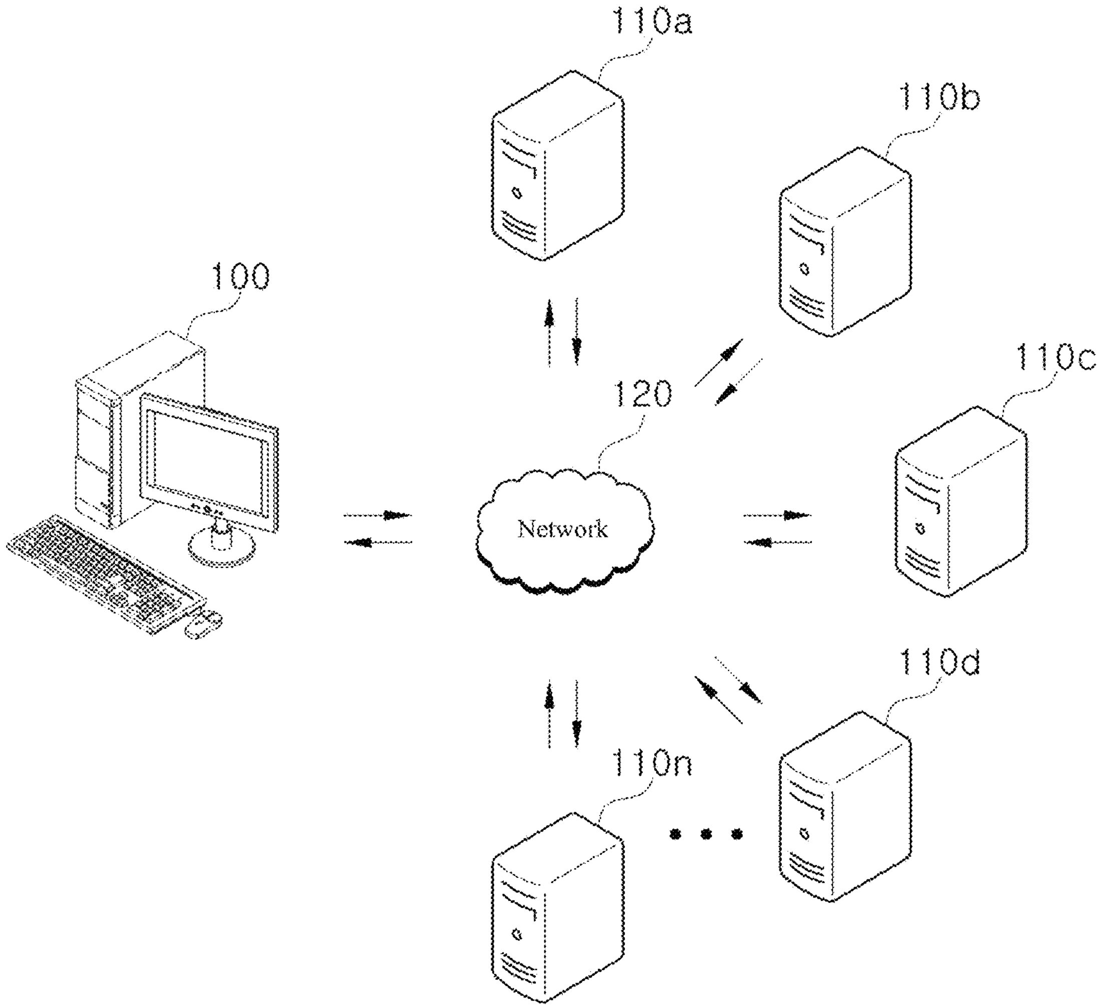
FIG. 1 is a view illustrating a system for deriving a domain connected to an IP address according to an embodiment of the present disclosure.

The same reference numerals will be assigned to the same components throughout the whole specification. In the following description of the present specification, all components are not described, and content well known in the art to which the present disclosure pertains or the duplication between embodiments will be omitted. In the specification, the terms "~unit", "~module", "~member" or "~block" may be implemented in software or hardware. According to embodiments, a plurality of units, a plurality of modules, a plurality of members, or a plurality of blocks can be implemented by using one component or one unit, one module, one member, or one block may include a plurality of components.

In the whole specification, when a certain part is "linked to", "coupled to", or "connected with" another part, the certain part may be directly linked to, coupled to or connected with the another part, and an indirection link, an indirection coupling, or an indirection connection includes a link, a coupling, or a connection through a wireless communication network.

It will be understood that the terms "comprises," "comprising," "includes" and/or "including," when used herein, specify the presence of stated elements and/or components, but do not preclude the presence or addition of one or more other elements and/or components.

In the present specification, when a member is positioned on another member "surface" or "above", this includes not only when the member is in contact with the other member, but also when another member is present between the two members.

In the specification, the term "first and/or second" will be used to distinguish between components, and the components are not limited to the above-described terminology.

The articles "a," "an," and "the" are singular in that they have a single referent, but the use of the singular form in the specification should not preclude the presence of more than one referent.

Reference numerals in steps are only for the illustrative purpose, and not used to describe the sequence of the steps. The steps may be replicated in a sequence different from a sequence, which is described, unless otherwise specified.

Hereinafter, the operating principle of the present disclosure and embodiments will be described with reference to accompanying drawings.

Herein, "a device according to the present disclosure" includes various devices to provide a result for a user by performing an arithmetic operation. For example, the "device according to the present disclosure" may include all a computer, a server device, and a portable terminal or be provided in the form of any one of a computer, a server device, and a portable terminal.

In this case, the computer may for example include a notebook computer, a desktop, a laptop computer, a tablet PC, or a slate PC equipped with a WEB browser.

The server device, which is a server to process information by making communication with an external device, may include an application server, a computing server, a database server, a file server, a game server, an e-mail server, a proxy server, and a web-server.

The portable terminal, which is, for example, a wireless communication device ensuring portability and mobility, may include, all kinds of handheld-based wireless communication devices, such as a Personal Communication System (PCS), a Global System for Mobile communications (GSM), a Personal Digital Cellular (PDC), a Personal Handyphone System (PHS), a Personal Digital Assistant (PDA), an International Mobile Telecommunication (IMT)-2000, a Code Division Multiple Access (CDMA)-2000, a W-Code Division Multiple Access (W-CDMA), a Wireless Broadband Internet (Wibro) terminal or a smart phone, or a wearable device, such as a watch, a ring, a bracelet, an anklet, a necklace, glasses, contact lens, or a head-mounted-device (HMD).

A function related to the AI according to the present disclosure is performed through a processor and a memory. The processor may include one processor or a plurality of processors. In this case, the one processor or the plurality of processors may be a general-purpose processor, such as a central processing unit (CPU), an application processor (AP), a digital signal processor (DSP), a graphic-dedicated processor, such as a graphic processing unit (GPU), or a vision processing unit (VPU), or an AI-dedicated processor such as a neural processing unit (NPU). The one processor or the plurality of processors control to process input data based on a previously defined operating rule stored in the memory or an AI model. Alternatively, when the one processor or the plurality of processors are the AI-dedicated processor, the AI-dedicated processor may be designed in a hardware structure specified for processing of a specific AI model.

The previously defined operating rule or the AI model is characterized as being made through training. In this case, the wording “being made through training” refers to that the previously defined operating rule or the AI model is made to be configured to perform a desirable characteristic (or purpose), as a basic AI model is trained using multiple pieces of learning data through a learning algorithm. The training may be performed in a device to perform the AI according to the present disclosure, or may be performed through an additional server and/or system. The learning algorithm may include, for example, a supervised learning algorithm, an unsupervised learning algorithm, a semi-supervised learning algorithm, or a reinforcement learning algorithm, but the present disclosure is not limited thereto.

The AI model may include a plurality of neural network layers. The plurality of neural network layers have a plurality of weight values, and perform a neural network operation through the operation between an operation result from a previous layer and the plurality of weight values. The plurality of weight values having the plurality of neural network layers may be optimized based on a training result of the AI model. For example, the plurality of weight values may be updated to reduce or minimize a loss value or a cost value obtained from the AI model during training. An artificial neural network (ANN) may include a Deep Neural Network (DNN). For example, the ANN may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), or a deep Q-network, but the present disclosure is not limited to the above example.

According to an embodiment of the present disclosure, the processor may implement AI. The AI refers to a machine-learning scheme based on the ANN which trains machine by mimicking biological neurons of a human being. AI methodologies may be classified, depending on learning schemes, into a Supervised Learning scheme, in which both input and output data are provided as learning data, so an answer (output data) to a problem (input data) is determined, an Unsupervised Learning scheme, in which only the input data is provided without the output data, so the answer (output data) of the problem (input data) is not determined, and a Reinforcement Learning scheme in which a reward is given from an external environment whenever any action is taken in a present state, and learning is performed to maximize the reward. The AI methodologies may be classified, depending on an architecture, which the structure of the learning model. The architecture of the deep learning technology, which has been extensively used, may be classified into a Convolutional Neural Network (CNN), a Recurrent Neural Network (RNN), a transformer, and a generative adversarial network (GAN).

A present device and a system may include an AI model. The AI model may be one AI model, and may be implemented as a plurality of AI models. The AI model may include a neural network (or artificial neural network), and may include a statistical learning algorithm which mimics the nerves of biology in machine learning and cognitive science. The neural network may refer to an overall model having a problem solving ability, as an artificial neuron (node) forming a network through the binding of synapses changes the binding intensity of synapses through learning. The neuron of the neural network may include the combination of weights or biases. The neural network may include at least one layer including at least one neuron or node. For example, the device may include an input layer, a hidden layer, or an output layer. The neural network forming the device changes the weights of neurons through learning to infer an output to be predicted based on an arbitrary input.

The processor may generate a neural network, train the neural network or allow the neural network to learn, perform an operation based on input data received, generate an information signal based on the result of the operation, or retrain the neural network. Models of the neural network may include various types of models, such as a Convolution Neural Network (CNN) including GoogleNet, AlexNet, or VGG Network, a Region with Convolution Neural Network (R-CNN), a Region Proposal Network (RPN), a Recurrent Neural Network (RNN), a Stacking-based deep Neural Network (S-DNN), a State-Space Dynamic Neural Network (S-SDNN), a Deconvolution Network, a Deep Belief Network (DBN), a Restricted Boltzman Machine (RBM), a Fully Convolutional Network, a Long Short-Term Memory (LSTM) Network, or a Classification Network, but the present disclosure is not limited thereto. The processor may include at least one processor to perform an operation based on the models of the neural network. For example, the neural network may include a Deep Neural Network.

The neural network may include a Convolutional Neural Network (CNN), a Recurrent Neural Network (RNN), a perceptron, a multilayer perceptron, a Feed Forward (FF), a Radial Basis Network (RBF), a Deep Feed Forward (DFF), a Long Short Term Memory (LSTM), a Gated Recurrent Unit (GRU), an Auto Encoder (AE), a Variational Auto Encoder (VAE), a Denoising Auto Encoder (DAE), a Sparse Auto Encoder (SAE), a Markov Chain (MC), a Hopfield Network (HN), a Boltzmann Machine (BM), a Restricted Boltzmann Machine (RBM), a Depp Belief Network (DBN), a Deep Convolutional Network (DCN), a Deconvolutional Network (DN), a Deep Convolutional Inverse Graphics Network (DCIGN), a Generative Adversarial Network (GAN), Liquid State Machine (LSM), Extreme Learning Machine (ELM), an Echo State Network (ENS), a Deep Residual Network (DRN), a Differentiable Neural Computer (DNC), Neural Turning Machine (NTM), a Capsule Network (CN), a Kohonen Network (KN), and an Attention Network (AN), but the present disclosure is not limited thereto. In other words, it may be understood by those skilled in the art that the present disclosure includes an arbitrary neural network.

According to an embodiment of the present disclosure, the processor may employ various AI structures and algorithms, which include a Convolution Neural Network (CNN) including GoogleNet, AlexNet, or VGG Network, a Region with Convolution Neural Network (R-CNN), a Region Proposal Network (RPN), a Recurrent Neural Network (RNN), a Stacking-based deep Neural Network (S-DNN), a State-Space Dynamic Neural Network (S-SDNN), a Deconvolution Network, a Deep Belief Network (DBN), a Restricted Boltzman Machine (RBM), a Fully Convolutional Network, a Long Short-Term Memory (LSTM) Network, a Classification Network, Generative Modeling, explainable AI, Continual AI, Representation Learning, AI for Material Design, BERT, SP-BERT, MRC/QA, Text Analysis, Dialog System, GPT-3, or GPT-4 for processing of a natural language, Visual Analytics, Visual Understanding, or Video Synthesis for vision processing, or Anomaly Detection, Prediction, Time-Series Forecasting, Optimization, or Recommendation, Data Creation for ResNet data intelligence, but the present disclosure is not limited thereto, but the present disclosure is not limited thereto. Hereinafter, an embodiment of the present disclosure will be described with reference to accompanying drawings.

FIG. 1 is a view illustrating a system for deriving a domain connected to an IP address according to an embodiment of the present disclosure.

The system for deriving the domain connected to the IP address according to an embodiment of the present disclosure may include an electronic device 100, a plurality of external devices 110*a*, 110*b*, . . . , and 110*n*, and a network 120.

The electronic device 100 according to an embodiment of the present disclosure, which derives a domain connected to the IP address, may be implemented in the form of an electronic device, such as a server, a computer, an ultra-mobile PC (UMPC), a workstation, a net-book, personal digital assistants (PDA), a portable computer, a web-tablet, a wireless phone, a mobile phone, a smart phone, or a portable multimedia player (PMP), or may be a device included in any one of the electronic devices. According to an embodiment of the present disclosure, the electronic device 100 may derive a domain connected to the IP address based on Open Source INTelligence information (OSINT).

The electronic device 100 may receive a request for deriving a domain matched with an IP address, from at least one of the plurality of external devices 110*a*, 110*b*, . . . , and 110*n*, and may derive at least one domain corresponding to the IP information through a model trained based on the OSINT information, in response to the request for deriving the domain. The information about the derived domain may be provided to at least one of the plurality of external devices 110*a*, 110*b*, . . . , and 110*n*. The method for deriving at least one domain corresponding to the IP information will be described below with reference to FIGS. 2 to 6.

The method for deriving the domain corresponding to the IP information according to an embodiment of the present disclosure may be used for network management, such as detecting a fishing site, analyzing a security log, or limiting an authority for accessing a server. According to the method for driving the domain corresponding to the IP information according to an embodiment of the present disclosure, the domain connected to the IP address is derived based on the OSINT information, thereby exactly detecting a plurality of domains connected to the IP address. In addition, the domain connected to the IP address is derived based on an Artificial Intelligence (AI) model, thereby matching the IP address with the domain by reflecting a fluidity made due to the relationship between the IP address and the domain.

Figure 2:
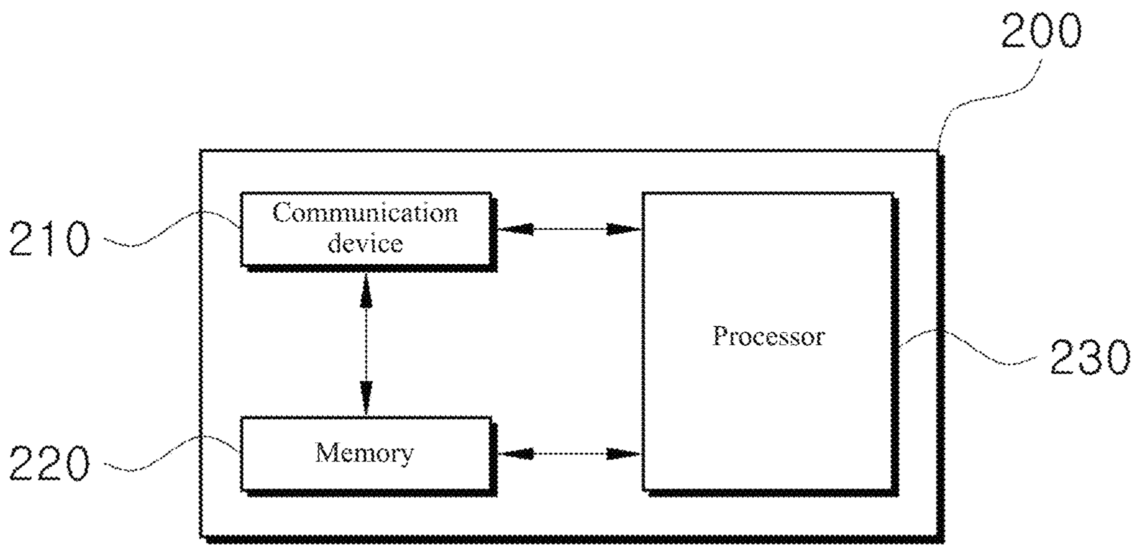
FIG. 2 is a block diagram illustrating an electronic device for deriving a domain connected to an IP address according to an embodiment of the present disclosure.

FIG. 2 is a block diagram illustrating an electronic device 200 for deriving a domain connected to an IP address according to an embodiment of the present disclosure.

Referring to FIG. 2, the electronic device 200 may include a communication device 210, a memory 220, and a processor 230. The electronic device 200 of FIG. 2 may correspond to the electronic device 100 of FIG. 1.

According to an embodiment of the present disclosure, the electronic device 200 may obtain the request for deriving the domain corresponding to the IP address through the communication device 210, and the request for deriving the domain corresponding to the IP address may include information (IP address information) about the IP address to be detected. According to an embodiment of the present disclosure, the communication device 210 may make communication with various types of external devices based on various types of communication schemes, and may include at least one of a Wi-Fi chip, a Bluetooth chip, a wireless communication chip, or a Near Field Communication (NFC) chip.

According to an embodiment, the Wi-Fi chip and the Bluetooth chip may make communication using a Wi-Fi scheme and a Bluetooth scheme, respectively. When using the Wi-Fi chip or Bluetooth chip, various pieces of connection information, such as SSID or a session key, may be first transmitted and received, a communication connection may be established using the connection information, and then various pieces of information may be transmitted and received. A wireless communication chip refers to a chip which makes communication depending on various communication standards, such as IEEE, Zigbee, 3$^{rd}$Generation (3G), 3$^{rd}$ Generation Partnership IP Project (3GPP), and Long Term Evolution (LTE). The NFC chip refers to a chip which operates through a Near Field Communication (NFC) scheme using the frequency band of a 13.56 MHz among various RF-ID frequency bands such as 135 kHz, 13.56 MHz, 433 MHZ, 860 MHz to 960 MHz, or 2.45 GHz.

According to an embodiment of the present disclosure, the memory 220 functions as a local storage medium to store the IP address information acquired from the outside and data processed by the processor 230, and the communication device 210 and the processor 230 may employ data stored in the memory 220 if necessary. In addition, according to an embodiment of the present disclosure, the memory 220 may store an instruction for operating the processor 230.

In addition, according to an embodiment of the present disclosure, the memory 220 should retain data even if power supplied to the electronic device 200 is cut off, and may include a writable non-volatile memory (a writable ROM) such that a change is reflected. In other words, the memory 220 may include any one of a flash memory, an Erasable Programmable Read-Only Memory (EPROM) or Electrically Erasable Programmable Read-Only Memory (EEPROM). In this specification, although information about all instructions is stored in one memory 220 for the convenience of explanation, the present disclosure is not limited thereto. The electronic device 200 may include a plurality of memories.

According to an embodiment of the present disclosure, the processor 230 may run an AI model to derive information about the domain corresponding to the IP address, and the AI model may be trained based a dataset (dataset) structured based on the OSINT information. According to an embodiment of the present disclosure, the processor 230 may run a plurality of AI models, and each of the plurality of AI models may be trained based on one dataset. According to an embodiment, the AI model may employ at least one of RandomForest, XGBoost, SVM, LightGBM, CatBoost, Logistic Regression, or Lasso. The details of the manner for training the AI model by the processor 230 and the dataset employed as the learning data will be described later in detail with reference to FIGS. 3 and 4.

Meanwhile, according to an embodiment of the present disclosure, the processor 230 may derive the domain corresponding to the IP address input through the plurality of AI models trained. When deriving the domain corresponding to the IP address based on the OSINT information, information about a plurality of domains may be detected. According to an embodiment of the present disclosure, the probability, in which each domain is a domain actually connected to the IP address, may be calculated through the plurality of AI models. According to an embodiment of the present disclosure, to calculate the probability related to each domain, an ensemble scheme may be applied to aggregate result values derived from the plurality of AI models. The details thereof will be described later in detail with reference to FIGS. 5 and 6.

Figure 3:
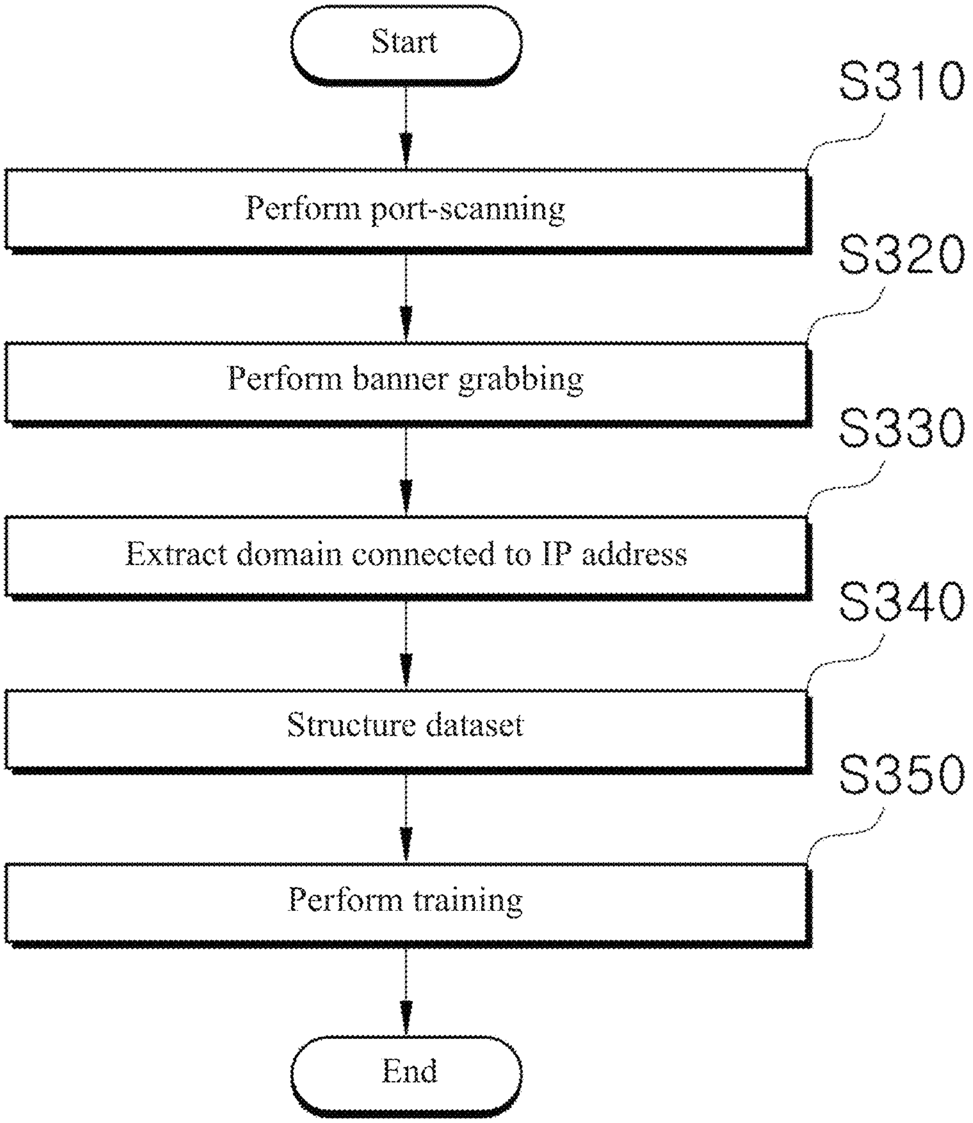
FIG. 3 is a flowchart illustrating a manner for training an AI model according to an embodiment of the present disclosure.

FIG. 3 is a flowchart illustrating a manner for training an AI model according to an embodiment of the present disclosure.

In S310, according to an embodiment of the present disclosure, the electronic device 200 (see FIG. 2) may perform a port-scanning operation with respect to the IP address. The port-scanning operation refers to a work to determine the type of a port of a target which is open. According to an embodiment of the present disclosure, the port-scanning operation may be performed based on at least one of a sweep scanning operation, a TCP connect scanning operation, a TCP Half-Open scanning operation, a TCP FIN/NULL/Xmas scanning operation, or a UDP scanning operation. According to an embodiment of the present disclosure, the electronic device 200 may extract only an IP address, in which an 80-th port or a 433-th port is open, among IP addresses included in all IP bands ranging from '1.0.0.0' to '223.255.255.255'.

In S320, according to an embodiment of the present disclosure, the electronic device 200 may perform a banner grabbing operation with respect to the IP address extracted in S310. The banner grabbing operation refers to a technology for detecting an operating system of a target server or a target system. Through the banner grabbing operation, a service, application information, or operating system information may be collected. According to an embodiment of the present disclosure, the electronic device 200 may extract a Hypertext Markup Language (HTML) source corresponding to the relevant IP address through the banner grabbing operation.

In S330, according to an embodiment of the present disclosure, the electronic device 200 may detect information about at least one domain connected to the IP address, based on the HTML source extracted. In detail, according to an embodiment of the present disclosure, the electronic device 200 may detect the information about the at least one domain connected to the IP address through a plurality of logics. In this specification, although the above description has been made in that the electronic device 200 detects the information about the at least one domain connected to the IP address through six logics, this is provided only for the illustrative purpose, and the present disclosure is not limited thereto.

In detail, according to an embodiment of the present disclosure, the electronic device 200 may detect the information about the domain based on a location of a 80-th port banner through a first logic, detect the information about the domain based on meta property="og:url" content="{domain_name}" of the 80-th and 433-th port banner trough a second logic, detect the information about the domain based on a Common Name of a certificate (SSL; Secure Sockets Layer) of the 433-th port banner through a third logic, detect the information about the domain based on "Subject CN" of the 433-th port banner certificate through a fourth logic, detect the information about the domain based on a 'DNS name' of the 433-th port banner certificate through a fifth logic, and extract all uniform resource locators (URLs) in a banner, and detect a domain, which occupies the highest proportion, among domains starting with 'www' using domain information through a sixth logic. The information about at least one domain corresponding to the IP address may be detected through the first to sixth logics described above. In general, multiple pieces of information (or multiple pieces of domain information) about the plurality of domains corresponding to one IP address may be detected.

In S340, according to an embodiment of the present disclosure, the electronic device 200 may structure a learning dataset based on the information about the domain corresponding to the IP address, which is derived in S330. The details of the learning dataset will be described later with reference to FIG. 4. In S350, the electronic device 200 may train the plurality of AI models based on the structured learning dataset. In addition, another electronic device 200 according to an embodiment of the present disclosure may update the learning dataset periodically, based on the fluidity of the connection between the IP address and the domain, and may perform a training operation based on the updated dataset.

FIG. 4 is a view illustrating a dataset used for training an AI model according to an embodiment of the present disclosure.

According to an embodiment, FIG. 4 illustrates the learning dataset to be structured when information about first to forth domains (sample_1.com, sample_2.com, sample_3.com, and sample_4.com) is detected to correspond to one IP address. According to an embodiment of the present disclosure, the learning dataset may include information about whether to use the first to sixth logics logic_1, logic_2, logic_3, logic_4, logic_5, and logic_6 to derive the information about the domain, based on the HTML source, and a result value (is_real) refers to information for indicating whether the IP address is actually connected to the relevant domain.

Regarding the analysis of FIG. 4, the information about the first domain (sample_1.com) refers to that the information about the domain corresponding to the IP address is detected through the first logic (logic_1), the third logic (logic_3), and the fifth logic (logic_5). Accordingly, the information about the first domain (sample_1.com) refers to a domain connected to the IP address. The information about the second domain (sample_2.com) refers to that the information about the domain corresponding to the IP address is detected through the second logic (logic_2), the fourth logic (logic_4), and the sixth logic (logic_6). Accordingly, the information about the second domain (sample_2.com) refers to a domain not connected to the IP address. The information about the third domain (sample_3.com) refers to that the information about the domain corresponding to the IP address is detected through the first logic (logic_1). Accordingly, the information about the third domain (sample_3.com) refers to a domain connected to the IP address. Meanwhile, the information about the fourth domain (sample_4.com) refers to that the information about the domain corresponding to the IP address is detected through the third logic (logic_3), and the sixth logic (logic_6). Accordingly, the information about the fourth domain (sample_4.com) refers to a domain not connected to the IP address.

According to an embodiment of the present disclosure, the electronic device 200 (see FIG. 2) may structure the learning dataset corresponding to an IP address extracted as a IP address in which the 80-th port or the 433-th port is open in S310, and the plurality of AI models may be trained using the structured learning dataset.

FIG. 5 is a view to describe data input into an AI model to derive a domain according to an embodiment of the present disclosure.

According to an embodiment of the present disclosure, to derive the domain corresponding to the IP, the port-scanning operation and the banner grabbing operation may be performed with respect to data input into the AI model, and the data input into the AI model may be implemented in the form of the input dataset. In detail, referring to FIG. 5, the first to third domains A, B, and C may be detected through the port-scanning operation and the banner-grabbing operation for a specific IP address. In FIG. 5, a first domain 'A' is detected through the first logic (logic_1), the second logic (logic_2), and the sixth logic (logic_6). A second domain 'B' is detected through the third logic (logic_3), the fourth logic (logic_4), and the fifth logic (logic_5). A third domain 'C' is detected through the fourth logic (logic_4) and the fifth logic (logic_5). The input dataset illustrated in FIG. 5 may be input for a plurality of AI models. According to an embodiment of the present disclosure, the electronic device 200 (see FIG. 2) may derive the probability in which the domain is a domain actually connected to the IP address, from each of the AI models. The method for deriving the domain connected to the IP address based on the input dataset of FIG. 5 will be described later with reference to FIG. 6.

Figure 6:
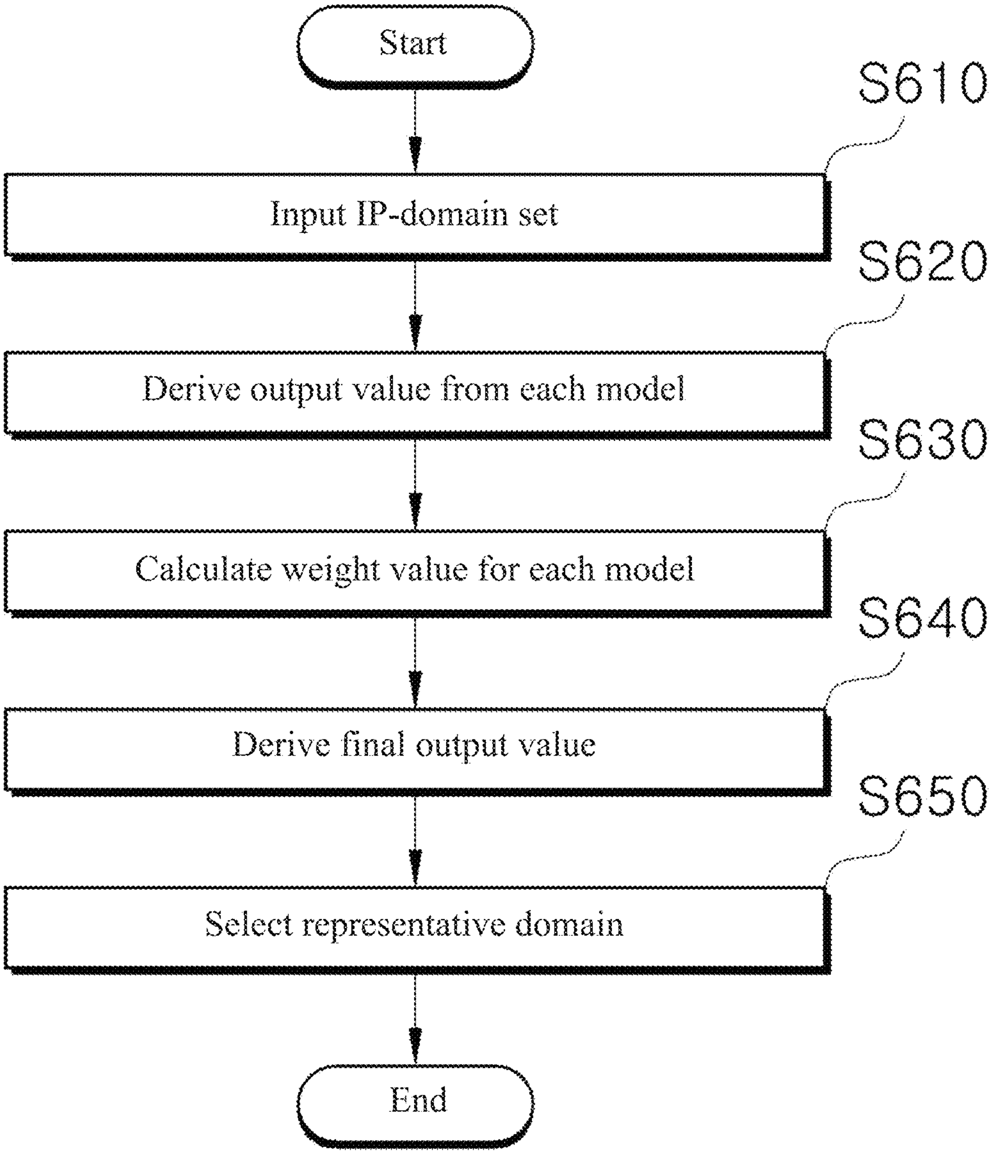
FIG. 6 is a flowchart illustrating a method for deriving a domain connected to an IP address according to an embodiment of the present disclosure.

FIG. 6 is a flowchart illustrating a method for deriving a domain connected to an IP address according to an embodiment of the present disclosure.

In S610, according to an embodiment of the present disclosure, the electronic device 200 (see FIG. 2) may input a domain information set (input dataset) corresponding to an IP address into each of the plurality of AI models. According to an embodiment, RandomForest, XGBoost, SVM, LightGBM, CatBoost, Logistic Regression, and Lasso models may be used. Each of seven AI models may be trained by using the learning dataset based on the principle described with reference to FIGS. 3 and 4 described above.

In S620, according to an embodiment of the present disclosure, the electronic device 200 may derive an output value from each AI model, based on the input dataset. According to an embodiment of the present disclosure, an output value indicating the probability in which a specific domain is connected to the relevant IP address, may be derived from each AI model. According to an embodiment of the present disclosure, the output value output from the each AI model may be calculated based on feature importance for the plurality of logics. For example, when the domain detected through the first logic is actually a representative domain in many cases, the feature importance for the first logic may be set to be higher. Accordingly, the output value for the domain detected through the first logic may be derived as a higher value.

In S630, according to an embodiment of the present disclosure, the electronic device 200 may calculate a weight value for the output value output from each AI model. According to an embodiment of the present disclosure, the electronic device 200 may calculate the optimized weight value based on the performance of each of the plurality of AI models In S640, according to an embodiment of the present disclosure, the electronic device 200 may derive the final output value corresponding to the information about the domain based on the output value and the weight value for each of the plurality of AI models derived in S620 and S630. When deriving the final output value, the ensemble scheme may be applied, and the operation may be performed through following Equation 1. In Equation 1, 'w1' to 'wn' refer to weight values calculated for the plurality of AI models, '$OUT_1$' to '$OUT_n$' refer to output values output from the plurality of AI models. The '$OUT_{final}$' refers to the final output value derived from the electronic device 200 according to an embodiment of the present disclosure. For example, when seven AI models are used, 'n' may be 7.

$$OUT_{final} = w1 * OUT_1 + w2 * OUT_2 + \ldots + wn * OUT_n \quad \text{Equation 1}$$

$$(\text{However, } w1 + w2 + \ldots + wn = 1).$$

In S650, according to an embodiment of the present disclosure, the electronic device 200 may select the representative domain based on the final output value. In detail, based on the input dataset illustrated in FIG. 5 described above, when the final output value for the first domain 'A' (see FIG. 5) may be 0.96%, the final output value for the second domain 'B' (see FIG. 5) is 0.83%, and the final output value for the third domain 'C' (see FIG. 5) is 0.81%, the first domain 'A' showing the highest final output value may be selected as the representative domain. The representative domain may refer to a domain actually connected to the relevant IP.

According to the present disclosure, the domain connected to the IP address may be derived based on the Open Source INTelligence (OSINT) information to exactly detect the plurality of domains connected to the Internet Protocol (IP) address.

According to the present disclosure, the domain connected to the IP address is derived based on the Artificial Intelligence (AI) model, thereby matching the IP address with the domain by reflecting a fluidity made due to the relationship between the IP address and the domain.

Meanwhile, disclosed embodiments may be implemented in the form of a recording medium to store an instruction executable by the computer. The instruction may be stored in the form of a program code. When the instruction is executed by a processor, the operation of embodiments disclosed by creating a program module will be performed. The recording medium may be implemented in the form of a recording medium readable by a computer.

The recording medium readable by the computer includes all type of recording media having an instruction decrypted by the computer. For example, the recording medium may include a read only memory (ROM), a random access memory (RAM), a magnetic tape, a magnetic disc, a flash memory, and an optical data storage device.

The above description has been made regarding embodiments of the present disclosure with reference to accompanying drawings. It can be understood by those skilled in the art to which the present disclosure pertains that the present disclosure is carried out in other detailed forms without changing the technical spirits and essential features thereof. Disclosed embodiments are provided only for the illustrative purpose, and the present disclosure should not be interpreted to be limited.

While the present disclosure has been described with reference to embodiments, it will be apparent to those skilled in the art that various changes and modifications may be made without departing from the spirit and scope of the present disclosure. Therefore, it should be understood that the above embodiments are not limiting, but illustrative.

What is claimed is:

1. An electronic device for deriving a domain connected to an Internet Protocol (IP) address, the electronic device comprising:

a communication device configured to make communication with an outside;

a memory; and a processor including at least one core, wherein the processor is configured to:

detect multiple pieces of domain information corresponding to a target IP address based on a Hypertext Markup Language (HTML) source;

input an input dataset, which is related to the multiple pieces of domain information, into each of a plurality of models which is trained through a machine-learning scheme;

derive an output value from each of the plurality of models, based on the input dataset;

calculate a weight value corresponding to the each of the plurality of models;

derive a final output value corresponding to each of the multiple pieces of domain information, based on the output value derived from the each of the plurality of models and the weight value corresponding to each of the plurality of models; and select representative domain information by comparing the final output values with each other, wherein the final output values correspond to the multiple pieces of domain information, wherein the HTML source is extracted through a banner grabbing operation corresponding to the target IP address, wherein the multiple pieces of domain information is detected from the HTML source using a plurality of logics preset, wherein the plurality of logics include:

a first logic for detecting domain information based on a location of an 80-th port banner for the target IP address;

a second logic for detecting the domain information based on meta property=:"og:url"content="{domain_name}" of the 80-th port banner and a 433-th port banner for the target IP address;

a third logic for detecting the domain information based on a Common Name of a certificate (SSL; Secure Sockets Layer) of the 433-th port banner for the target IP address;

a fourth logic for detecting the domain information based on "Subject CN" of the 433-th port banner certificate for the target IP address;

a fifth logic for detecting the domain information based on a 'DNS name' of the 433-th port banner certificate for the target IP address; and a sixth logic for extracting all uniform resource locators (URLs) in a banner for the target IP address and for detecting a domain, which occupies a highest proportion, among domains starting with 'www', as the domain information.

2. The electronic device of claim 1, wherein the plurality of models include:

a RandomForest model, an XGBoost model, an SVM model, a LightGBM model, a CatBoost model, a Logistic Regression model, and a Lasso model.

3. The electronic device of claim 1, wherein the plurality of models is trained through the machine-learning scheme, based on a learning dataset corresponding to the IP address, and wherein the learning dataset is structured with respect to at least one IP address extracted through a port-scanning operation for a plurality of IP addresses.

4. The electronic device of claim 3, wherein the port-scanning operation is to extract the at least one IP address in which an 80-th port or a 433-port is open.

5. The electronic device of claim 3, wherein the learning dataset includes the multiple pieces of domain information detected based on an HTML source extracted through a banner grabbing operation corresponding to the at least one IP address.

6. The electronic device of claim 5, wherein the learning dataset is updated in every preset period.

7. A method performed by a processor of an electronic device to derive a domain connected to an Internet Protocol (IP) address, the method comprising:

detecting multiple pieces of domain information corresponding to a target IP address based on a Hypertext Markup Language (HTML) source;

inputting an input dataset related to the multiple pieces of domain information into a plurality of models which are trained through a machine-learning scheme;

deriving an output value from each of the plurality of models, based on the input dataset;

calculating a weight value corresponding to the each of the plurality of models;

deriving a final output value corresponding to each of the multiple pieces of domain information, based on the output value derived from the each of the plurality of models and the weight value corresponding to the each of the plurality of models, and selecting representative domain information by comparing the final output values with each other, wherein the final output values correspond to the multiple pieces of domain information, wherein the HTML source is extracted through a banner grabbing operation corresponding to the target IP address, wherein the multiple pieces of domain information is detected from the HTML source using a plurality of logics preset, and wherein the plurality of logics include:

a first logic for detecting domain information based on a location of an 80-th port banner for the target IP address;

a second logic for detecting the domain information based on meta property="og:url"content="{domain_name}" of the 80-th port banner and a 433-th port banner for the target IP address;

a third logic for detecting the domain information based on a Common Name of a certificate (SSL; Secure Sockets Layer) of the 433-th port banner for the target IP address;

a fourth logic for detecting the domain information based on "Subject CN" of the 433-th port banner certificate for the target IP address;

a fifth logic for detecting the domain information based on a 'DNS name' of the 433-th port banner certificate for the target IP address; and a sixth logic for extracting all uniform resource locators (URLs) in a banner for the target IP address and for detecting a domain, which occupies a highest proportion, among domains starting with 'www' as the domain information.

8. The method of claim 7, wherein the plurality of models include:

a RandomForest model, an XGBoost model, an SVM model, a LightGBM model, a CatBoost model, a Logistic Regression model, and a Lasso model.

9. The method of claim 7, wherein the plurality of models are trained through the machine-learning scheme, based on a learning dataset corresponding to the IP address, and wherein the learning dataset is structured with respect to at least one IP address extracted through a port-scanning operation for a plurality of IP addresses.

10. The method of claim 9, wherein the port-scanning operation is to extract the at least one IP address in which an 80-th port or a 433-port is open.

11. The method of claim 9, wherein the learning dataset includes the multiple pieces of domain information detected based on an HTML source extracted through a banner grabbing operation corresponding to the at least one IP address.

12. The method of claim 11, wherein the learning dataset is updated in every preset period.

* * * * *